(12) United States Patent
Swedlund et al.

(10) Patent No.: US 10,868,892 B1
(45) Date of Patent: Dec. 15, 2020

(54) REPLACEMENT CODE IMPLEMENTING FULL-DUPLEX COMMUNICATION CHANNEL PROTOCOL FOR MESSAGE INTERCEPTION

(71) Applicant: ENTIT Software LLC, Sanford, NC (US)

(72) Inventors: Thomas Christopher Swedlund, Alpharetta, GA (US); Brian Charles King, Alpharetta, GA (US)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/428,694

(22) Filed: May 31, 2019

(51) Int. Cl.
*H04L 29/06* (2006.01)
*H04L 29/08* (2006.01)
*H04L 5/14* (2006.01)

(52) U.S. Cl.
CPC .............. *H04L 69/162* (2013.01); *H04L 5/14* (2013.01); *H04L 67/025* (2013.01); *H04L 67/141* (2013.01)

(58) Field of Classification Search
CPC ....... H04L 69/162; H04L 5/14; H04L 67/025; H04L 67/141
See application file for complete search history.

(56) References Cited

U.S. PATENT DOCUMENTS

| 5,754,774 A * | 5/1998 | Bittinger ................. H04L 29/06 709/203 |
| 9,307,031 B2 | 4/2016 | Santhanam et al. |
| 9,462,089 B1 | 10/2016 | Fallows |
| 10,185,670 B2 | 1/2019 | Litichever et al. |
| 2008/0209395 A1 * | 8/2008 | Ernst ......................... G06F 8/52 717/115 |
| 2014/0283069 A1 * | 9/2014 | Call .................... H04L 63/1441 726/23 |
| 2016/0119344 A1 * | 4/2016 | Freitas Fortuna dos Santos ........ H04L 63/0876 726/7 |
| 2016/0337384 A1 | 11/2016 | Jansson et al. |
| 2017/0289293 A1 * | 10/2017 | Rubtsov .............. H04L 67/2823 |
| 2018/0234341 A1 | 8/2018 | Ignatchenko |

FOREIGN PATENT DOCUMENTS

WO  2017127691  7/2017

OTHER PUBLICATIONS

Kirill Remizov, OWASP Zed Attack Proxy: Swiss Army Testing, https://medium.com/shakuro/owasp-zed-attack-proxy-swiss-army-testing-520cb601a266 , Jul. 18, 2017.

(Continued)

*Primary Examiner* — Arvin Eskandarnia

(57) ABSTRACT

Code implementing a full-duplex communication channel protocol within web browser software on a client computing device is replaced with replacement code. The replacement code intercepts incoming and outgoing messages on a channel opened at the web browser software between the client computing device and a server computing device running a web application. Responsive to the channel being opened at the web browser software, the replacement code intercepts and stores the incoming and outgoing messages.

20 Claims, 7 Drawing Sheets

(56) References Cited

OTHER PUBLICATIONS

Wicket 8.x Reference Guide, The Apache Software Foundation, https://ci.apache.org/projects/wicket/guide/8.x/single.html—May 22, 2018.

Notsosecure Global Services Limited; How Cross-Site WebSocket Hijacking could lead to full Session Compromise; https://www.notsosecure.com/how-cross-site-websocket-hijacking-could-lead-to-full-session-compromise/; Nov. 27, 2014; 7 Pages.

WebSocket—Web APIs MDN, retrieved online Apr. 30, 2019, <https://developer.mozilla.org/en-US/docs/Web/API/WebSocket>.

* cited by examiner

US 10,868,892 B1

REPLACEMENT CODE IMPLEMENTING FULL-DUPLEX COMMUNICATION CHANNEL PROTOCOL FOR MESSAGE INTERCEPTION

BACKGROUND

A significant if not the vast majority of computing devices are globally connected to one another via the Internet. While such interconnectedness has resulted in services and functionality almost unimaginable in the pre-Internet world, not all the effects of the Internet have been positive. A downside, for instance, to having a computing device potentially reachable from nearly any other device around the world is the computing device's susceptibility to malicious cyber attacks that likewise were unimaginable decades ago.

DETAILED DESCRIPTION

Figure 1:
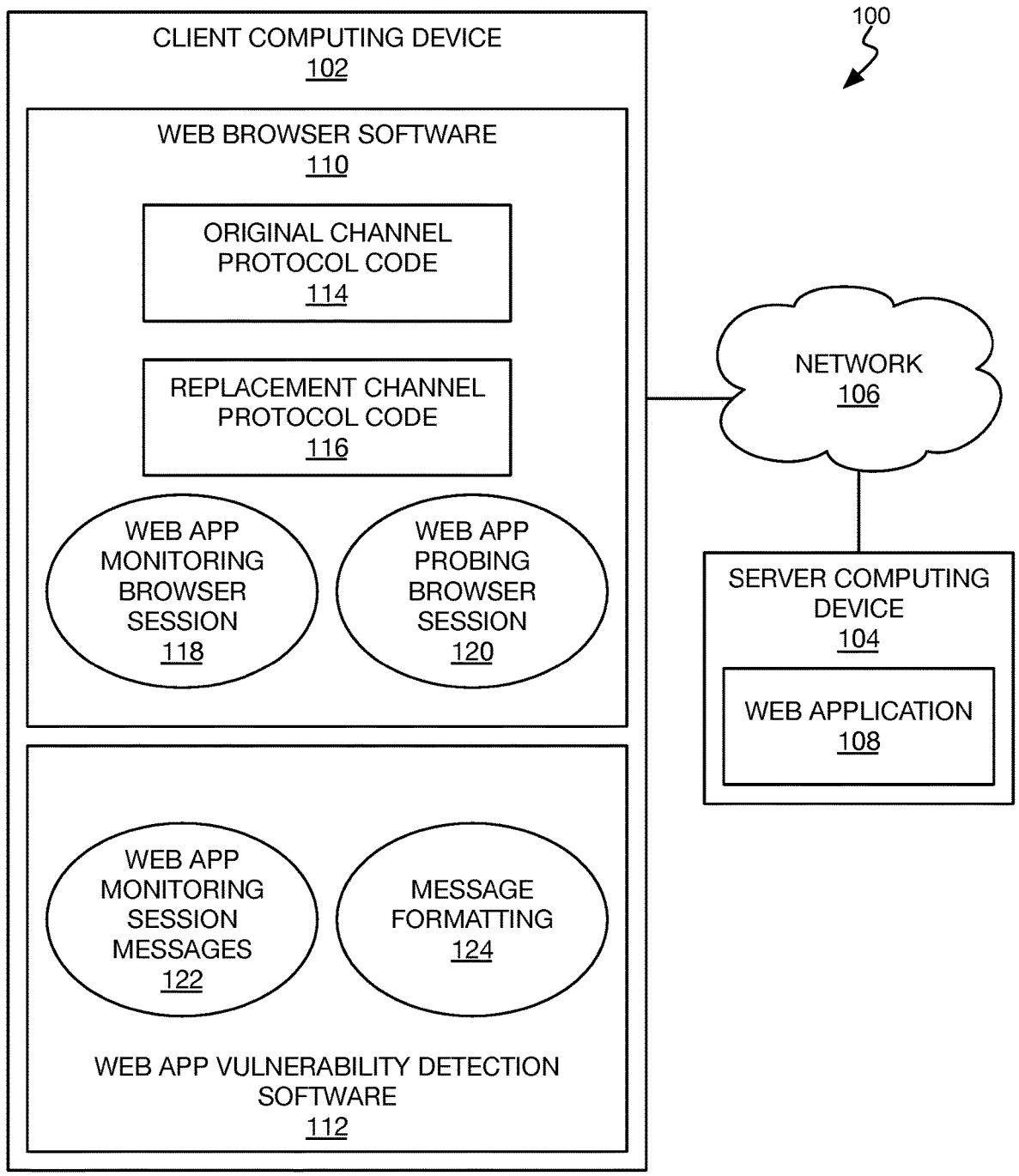
FIG. 1 is a diagram of an example computing system in which a client computing device communicates with a server computing device to run a web application at the server in the context of web browser software at the client that includes replacement code implementing a full-duplex communication channel protocol.

As noted in the background, a large percentage of the world's computing devices can communicate with one another over the Internet, which while generally advantageous renders the computing devices susceptible to cyber attack. For instance, a server computing device may run a web application. Web browser software running on client computing devices can access the web application over the Internet. That is, a web application is a computer program that performs functionality, and which uses the web browser software of a client computing device as its client.

Running a web application can expose a server computing device to cyber attacks, particularly if the web application has security vulnerabilities that can a nefarious party can leverage to cause the application to perform unintended functionality and/or to access the underlying server computing device. Auditing Internet-facing server computing devices to identify potential security vulnerabilities has typically focused on network traffic employing the HyperText Transfer Protocol (HTTP), which is commonly used for client computing devices to access web sites and other web services hosted by server computing devices via web browser software running on the client computing devices.

HTTP is usually a non-persistent, half-duplex, request-response protocol, which means that a server computing device does not initiate data transfer to a client computing device unless and until the client first sends a request to the server.

Techniques to audit server computing devices to identify security vulnerabilities in the context of HTTP network traffic have focused on intercepting both the requests sent by client computing devices and the responses that are then returned by the servers. After such network traffic has been intercepted and analyzed, the requests can be modified or injected with additional data, and sent to a server computing device to assess how the server responds to the requests.

Based on how the server computing device responds to the malformed requests, the techniques can then determine whether the server has security vulnerabilities that can be leveraged by nefarious parties to compromise the server. The server may be correspondingly reconfigured, or the software implementing its web services updated, to harden the server against such potential cyber attacks.

However, existing such security auditing techniques are ill equipped for network traffic that does not employ HTTP. More modern web applications hosted by server computing devices, for instance, commonly employ persistent, full-duplex communication channel protocols, like the WebSocket protocol, to provide for a richer application experience than HTTP can provide. In the WebSocket and other persistent, full-duplex communication channel protocols, a client computing device first establishes a persistent channel, or socket in the parlance of the WebSocket protocol, with a server computing device running a web application, via the client's web browser software. For example, an existing HTTP connection between the client and the server may be upgraded to a persistent channel. Network traffic over the channel can be initiated at both the client and the server, and messages communicated on the channel can be formatted in a myriad of ways that are much more customizable than what the HTTP provides. As such, existing techniques for intercepting HTTP network traffic may not be able to properly or adequately intercept incoming and outgoing messages sent on a persistent, full-duplex communication channel like a socket.

Techniques described herein ameliorate these difficulties, providing for message interception on persistent, full-duplex communication channels between web browser software running on client computing devices and web applications running on server computing devices. The code that implements a full-duplex communication channel protocol within the web browser software on a client computing device is replaced with replacement code that can intercept incoming and outgoing messages on a channel opened at the web browser between the client and a server computing device running a web application. Once the channel has been opened at the web browser software, such messages are thus intercepted and stored, via the replacement code.

Therefore, after a usage session of the web application of the server computing device has been finished at the web browser software of the client computing device, the intercepted incoming and outgoing messages that have been stored can be parsed to determine how information is formatted within the messages. Information formatting in this respect can vary on a web application basis. That is, different web applications can format how information is contained in messages transmitted between the client and the server in vastly different ways, even though the applications may all rely on the same underlying full-duplex communication channel protocol, like the WebSocket protocol, to communicate the messages. Once this information formatting has been determined for a web application running on a server computing device, the web application can then be probed to identify any security vulnerabilities within the application.

FIG. 1 shows an example system 100. The system 100 includes a client computing device 102 and a server computing device 104 that can communicate with one another over a network 106. The client computing device 102 may be a desktop or laptop computer, for instance, or another type of computing device, like a smartphone, tablet computing device, and so on. The server computing device 104 may be a standalone server computing device or a server computing device, like a blade computing device, installed within a rack with other server computing devices. The client computing device 102 is also referred to herein as the client 102, and the server computing device 104 is also referred to herein as the server 104. The network 106 can be or include the Internet, intranets, extranets, and other types of networks.

A web application 108 runs on the server 104, whereas web browser software 110 and web application vulnerability detection software 112 run on the client 102. The web application 108 is a client-server software application program that the client 102 runs on the server 104 via the web browser software 110. The web browser software 110 is thus effectively a client of the web application 108, where input and output of the web application 108 occur at the web browser software 110.

The web browser software 110 can in one implementation, for example, be a version of the Firefox® web browser software available from the Mozilla Foundation of Mountain View, Calif. The web browser software 110 includes original channel protocol code 114 that implements a full-duplex communication channel protocol, so that browser sessions can use the full-duplex communication channel protocol. The original channel protocol code 114 is also referred to herein as the original code 114. The original code 114 may be the code within an interpreted programming language engine that the web browser software 110 uses to instrument a full-duplex communication channel class. As an example, the original code 114 may be the code within a JavaScript® engine that instruments a WebSocket class.

The web browser software 110 includes replacement channel protocol code 116 that replaces the original channel protocol code 114. The replacement channel protocol code 116 is also referred to herein as the replacement code 116. The original code 114 remains within the web browser software 110, and the replacement code 116 itself can still use the original channel protocol code 114. The replacement code 116 re-instruments aspects of the full-duplex communication channel class, such as the WebSocket class, so that incoming and outgoing messages on a full-duplex communication channel opened at the web browser software 110 between the client 102 and the server 104 running the web application 108 can be intercepted. A particular implementation of the replacement code 116 in the context of the WebSocket protocol is described in detail below.

A web application monitoring browser session 118 initiated at the web browser software 110 interacts with the replacement code 116 to open a channel between the client 102 and the server 104 to run the web application 108 on the server 104 in the context of the session 118. The web application monitoring session 118 is also referred to herein as the monitoring session 118. The replacement code 116 may re-instrument various functions of the full-duplex communication channel class with identically named functions, such that the monitoring session 118 may be unaware that it is using the replacement code 116 and not the original code 114. Once the replacement code 116 has received and processed such function calls, the code 116 may then proceed to call the original code 114, as is described in detail below.

Usage of the web application 108 running on the server 104 within the monitoring session 118 servers results in incoming messages from the server 104 to the client 102 and outgoing messages from the client 102 to the server 104 that the replacement code 116 can intercept. That is, the usage of the web application 108 within the monitoring session 118 does not itself probe the server 104 generally or the web application 108 specifically for security vulnerabilities, but rather generates the raw data—the incoming and outgoing messages—that can be subsequently parsed to determine the formatting of information within these messages. Usage of the web application 108 within the monitoring session 118 may thus occur in accordance with a prepared script corresponding to typical and complete usage of the features of the application 108 (as may be controlled or directed by the web application vulnerability detection software 112), so that a full set of incoming and outgoing messages can be intercepted.

As the client 102 generates outgoing messages within the monitoring session 118 of the web browser software 110, the replacement code 116 intercepts the messages before passing them to the original code 114 for transmission to the server 104 running the web application 108. Similarly, as the client 102 receives incoming messages from the server 104 running the web application 108, the replacement code 116 also intercepts the messages as they are passed to the monitoring session 118 of the web browser software 110. Upon interception of incoming and outgoing messages, the replacement code 116 can transmit them to the web application vulnerability detection software 112, at which the messages are stored as the web application monitoring session messages 122.

The web application vulnerability detection software 112 thus has a store of messages 122 that are intercepted during normal or typical usage of the web application 108 within the monitoring session 118 of the web browser software 110. In one implementation, once the monitoring session 118 is finished and the full-duplex communication channel between the client 102 and the server 104 effectively closed, the vulnerability detection software 112 can proceed to parse the stored intercepted messages 122 to determine the message formatting 124 by which information contained within the messages 122 is formatted or organized. In another implementation, parsing can begin before the monitoring sessions 118 has completed. The approach that the vulnerability detection software 112 uses to parse the messages 122 and determine the message formatting 124 can be any of a number of different approaches, including approaches similar to those used in the context of parsing HTTP messages. For example, the messages 122 may be assumed to be in accordance with the Streaming/Simple Text Oriented Message Protocol (STOMP), which is a text-based messaging protocol similar to HTTP. The messaging formatting 124 that may be identified may be a markup language-type formatting, such as an eXtensible Markup Language (XML)-type formatting, or another type of formatting, including the JavaScript Object Notation (JSON) format.

The web application vulnerability detection software 112 can in one implementation then spawn a web application probing browser session 120, which is also referred to herein as a probing session 120, at the web browser software 110 to open a channel between the client 102 and the server 104 within which messages are exchanged to run the web application 108 at the server 104 in the context of the session 120. In another implementation, the vulnerability detection software 112 may not spawn a probing browser session 120 in the context of the web browser software 110, but rather directly interact with the web application 108 from within the detection software 112. The vulnerability detection software 112 may use the same prepared script to interact with the web application 108 within the probing session 120 as was used in the monitoring session 118. However, because the message formatting 124 is now known, the vulnerability detection software 112 can modify or inject outgoing messages with additional information or code to probe the web application 108 running at the server 104 for potential security vulnerabilities.

The incoming messages received back from the server 104 can then be inspected by the vulnerability detection software 112 (after interception by the replacement code 116) to assess the vulnerability of the web application 108 at the server 104 to the changes that the software 112 made in the outgoing messages. The approach that the vulnerability detection software 112 uses to probe the web application 108 and then assess vulnerabilities thereof can be any of a number of different approaches, including approaches similar to those used in the context of probing and assessing security vulnerabilities of web sites or applications that employ HTTP, such as in the context of the STOMP text-based messaging protocol.

Figure 2:
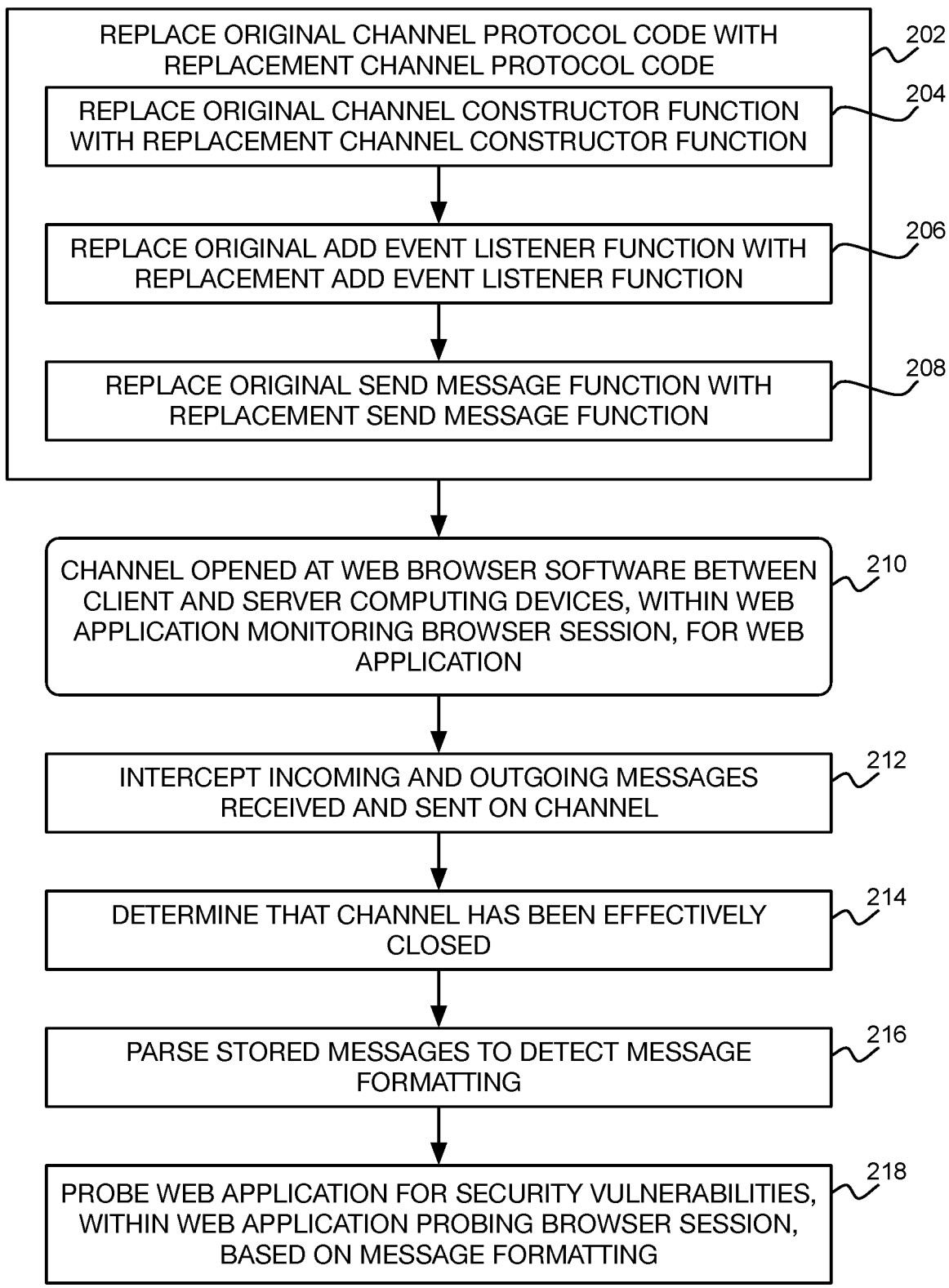
FIG. 2 shows a flowchart of an example method for intercepting messages on a full-duplex communication channel between a server computing device running a web application and a client computing device, to aid in assessing the web application and the server for security vulnerabilities.

FIG. 2 shows an example method 200 that can be performed within the computing system 100. The method 200 can be performed by a computing device, such as the client computing device 102. The method 200 can be implemented as program code stored on a non-transitory computer-readable data storage medium and executed by the computing device.

The original channel protocol code 114 is replaced with replacement channel protocol code 116 within the web browser software 110 (202). Such replacement code 116 can include the following. An original channel constructor function within the original code 114 can be replaced with a replacement channel constructor function of the replacement code 116 (204). The original channel constructor function is normally called to create a channel object, so that a channel can be subsequently opened between the client 102 and the server 104.

Opening a persistent, full-duplex communication channel between the client 102 and the server 104 on which the web browser software 110 can run the web application 108 on the server 104 within the context of a browser session such as the web application monitoring browser session 118 is thus a two-part process. First, a channel object is created, which is a software object. Second, a communication channel associated with the created, or constructed, channel object is opened between the client 102 and the server 104.

The replacement channel constructor function has the same function name as the original channel constructor function. Therefore, when a function of this function name is called by the web browser software 110 to create a channel object to be associated with a subsequently opened channel between the client 102 and the server 104, the replacement channel constructor function is called instead of the original channel constructor function. The web browser software 110 may not realize that it is calling the replacement function instead of the original function, because the replacement function has the same name as the original function. The original function may be renamed in this respect, for instance, or may not be exposed.

When called, the replacement channel constructor function calls the original channel constructor function and also performs additional processing. The replacement function adds an identifier to the channel object that uniquely identifies the channel object—and thus the subsequently opened channel associated with the object—within the replacement channel protocol code 116 and within the vulnerability detection software 112. As noted below, when outgoing and incoming messages on the channel are intercepted, the identifier of the associated channel object is added to each message, so that the vulnerability detection software 112 can properly group messages by the web application 108 and the unique browser session of the application 108 to which the messages correspond.

The replacement channel constructor function can also increment an open pending count. Construction of a channel object does not mean that a channel associated with the object has been opened. That is, opening a channel associated with a channel object is a separate process from creating the object in the first place. By incrementing an open pending count, the replacement channel protocol code 116 can in effect track the number of channels that are intended to be opened (via creation of channel objects) but that have not yet been opened (via subsequent opening of the channels associated with the objects). When a channel is opened, the open pending count is then decremented. The open pending count can be subsequently used to determine whether a web application monitoring browser session 118 has finished using the web application 108—i.e., to determine whether a channel between the client 102 and the server 104 has been effectively closed.

Specifically, that there is no open channel between the client 102 and the server 104 does not mean that usage of the web application 108 is finished. This is because a channel object may have been created but for which an associated channel has not yet been opened (as evidenced by a non-zero open pending count). All channels between the client 102 and the server 104 are not deemed to have been effectively closed if the open pending count is greater than zero.

The replacement channel constructor function can thus add an event listener to an open event. The original channel protocol code 114 fires or issues an open event each time a channel associated with any previously constructed channel object is opened, such as within a browser session like the web application monitoring browser session 118. By adding an event listener, the replacement function thus ensures that the replacement channel protocol code 116 is called when a channel is actually opened. The event listener added to the open event decrements the open pending count.

The replacement function can also override an open property of the channel object in this respect, too. When a channel associated with a channel object is opened, the open property can specify an event listener to be called. The replacement function thus overrides the open property to decrement the open pending count.

When the replacement channel constructor function is called, the replacement function further adds an event listener to an incoming message event for the channel object that the original function returns. The original channel protocol code 114 fires or issues an incoming message event each time an incoming message is received from the server computing device 104 on the channel associated with the channel object. By adding an event listener, the replacement function thus ensures that the replacement channel protocol code 116 is called when an incoming message is received (in addition to any event listeners that may be added within the web application monitoring browser session 118 as part of the normal usage of the web application 108).

The event listener added to the incoming message event stores every incoming message received from the web application 108 on the channel associated with the channel object, along with the identifier of the channel object. That is, the event listener effectively intercepts each incoming message, and transmits each incoming message (with the added identifier) to the vulnerability detection software 112 at which the incoming messages are stored as the web application monitoring session messages 122. More generally, the event listener may otherwise stores each incoming message (with the added identifier) within the web application monitoring session messages 122, with or without involvement of the vulnerability detection software 112.

The replacement function can also override a message property of the channel object in this respect, too. When an incoming message is received from the server 104, the message property can specify an event listener to be called. The replacement function thus overrides the message property to store each incoming message (with the added identifier) within the web application monitoring session messages 122, as described above in relation to the event listener that is also added.

Replacement of the original channel protocol code 114 with the replacement channel protocol code 116 can also include replacing an original add event listener function with a replacement add event listener function (206). The original add event listener function is normally called within a web application monitoring browser session 118 to add an event listener to the incoming message event for a created channel object (such as before an associated channel is subsequently opened). The event listener permits incoming messages received from the server 104 to be passed to the browser session 118 within the normal course of usage of the web application 108 within the session 118 of the web browser software 110 running on the client 102.

The replacement add event listener function has the same function name as the original add event listener function. Therefore, when a function of this function name is called by the web browser software 110 in the context of a browser session, like the monitoring browser session 118, to add an application-specific event listener to a created channel object, the replacement add event listener function is called instead of the original add event listener function. (The event listeners added by the monitoring session 118 are referred to as application-specific event listeners to distinguish them from the event listeners that the replacement code 114 has added in part 204.) The web browser software 110 may not realize that it is calling the replacement function instead of the original function, because the replacement function has the same name as the original function. The original function may be renamed in this respect, for instance, or may not be exposed.

When called, the replacement add event listener function temporarily removes the event listener that was added in part 204. In one implementation, just the last event listener that was added is temporarily removed. In another implementation, every event listener that has been added to the incoming message event for the channel object may be temporarily removed. The replacement add event listener function then calls the original add event listener function to add the specified event listener the channel object, before re-adding every temporarily removed event listener back to the object (such as by calling the original add event listener function for each removed event listener). This process ensures that the event listener that was added in part 204 is called last for an incoming message, after every other event listener added to the incoming message event has been called. Doing so ensures that any application-specific event listeners added in the context of the monitoring browser session 118 during normal usage of the web application 108 are in fact called.

Replacement of the original channel protocol code 114 with the replacement channel protocol code 116 can further include replacing an original send message function with a replacement send message function (208). The original send message function permits messages to be sent to the web application 108. The original send message function is specifically normally called within a web application monitoring browser session 118 to send an outgoing message on the channel between the client 102 and the server 104 during usage of the web application 108 in the context of the monitoring session 118.

The replacement send message function has the same function name as the original send message function. Therefore, when a function of this function name is called by the web browser software 110 in the context of a browser session, like the monitoring browser session 118, to send an outgoing message, the replacement send message function is called instead of the original send message function. The web browser software 110 may not realize that it is calling the replacement function instead of the original function, because the replacement function has the same name as the original function. The original function may be renamed in this respect, for instance, or may not be exposed.

When called, the replacement send message function stores every outgoing message intended from the web application 108 on the channel associated with the channel object, along with the identifier of the channel object. That is, the replacement send message function effectively intercepts each outgoing message, and transmits each outgoing message (with the added identifier) to the vulnerability detection software 112 at which the outgoing messages are stored as the web application monitoring session messages 122. More generally, the replacement send message function may otherwise store each outgoing message (with the added identifier) within the web application monitoring session messages 122, with or without involvement of the vulnerability detection software 112.

Once the outgoing message (with the added identifier) has been so stored, the replacement send message function then calls the original send message function to actually send the outgoing message over the channel to the server 104 running the web application 108. The replacement send message function may also increment a send pending count before calling the original send message function. The send pending count tracks the number of outgoing messages sent by the client 102 to the server 104 on the channel for which incoming messages have not been responsively received.

Therefore, the event listener added to the incoming message event (and the modified message property of the channel object) can decrement the send pending count each time an incoming message is received. Although there is not necessarily a one-to-one correspondence between messages sent to the web application 108 and messages received from the application 108, tracking the number of outgoing messages that have been sent and for which incoming messages have not been responsively received can nevertheless be useful in assessing whether an opened channel between the client 102 and the server 104 has been effectively closed. If the send pending count is overly high (such as greater than a threshold), then this can mean that the current browser session 118 of the web application 108 is still expecting information from the application 108, such that the session 118 should not be considered as having been finished (and the channel having been closed).

As noted above, the original channel protocol code 114 can be code within an interpreted programming language engine like the JavaScript® engine to instrument a WebSocket class. In such an implementation, the original channel constructor function that is replaced with a replacement channel construction function of the same name can be the WebSocket( ) constructor function. The events that are fired for such a WebSocket channel (i.e., socket) object can include a message event and an open event, for which the replacement channel protocol code 116 adds event listeners as described above. The properties of such a WebSocket object can include an "onmessage" property and an "onopen" property, which the replacement channel protocol code 116 can override as described above as to the message and open properties. Furthermore, in such an implementation, the original add event listener function that is replaced with a replacement add event listener function of the same name can be the WebSocket.addEventListener( ) method of a WebSocket object. The original send message function that is replaced with a replacement send message function of the same name can be the WebSocket.send( ) method of a WebSocket object.

Once the original channel protocol code 114 has been replaced with the replacement channel protocol code 116 within the web browser software 110 (202), a channel is opened at the web browser software 110 between the client 102 and the server 104 within the monitoring session 118 for the web application 108 (210). That is, in the context of the monitoring session 118 of the web browser software 110 in which the web application 108 running on the server 104 is to be used, the channel is opened between the client 102 and the server 104 by the web browser software 110. The channel is opened as has been described, via first calling the replacement channel constructor function to create a channel object, and then subsequently opening a channel associated with the object, such as via calling a channel open function.

Upon opening of the channel, incoming and outgoing messages received and sent on the channel are intercepted (212). Incoming messages from the web application 108 are received over the channel via the overridden message property or via the event listener added to the message event, as noted above. Outgoing messages to be sent to the web application 108 over the channel are received via the replacement send message function, as noted above. In both cases, the intercepted messages are appended with the identifier of the channel object associated with the channel, which was created when the channel was constructed via the replacement channel constructor function.

Once usage of the web application 108 has been finished in the context of the current monitoring session 118, the opened channel between the client 102 and the server 104 over which communication with the application 108 occurred is effectively closed. This can mean that the web browser software 110 actually closes the channel, such via calling a channel close function. However, in some cases, the web browser software 110 may not actually close the channel, but rather just stop using the channel.

To detect effective closure of the channel in this latter scenario, the replacement channel protocol code 116 can use the open pending and send pending counts that are maintained. If the open pending count is not zero, then this can mean that usage of the web application 108 in the context of the current monitoring session 118 has not yet even begun, since an associated channel has not yet been opened for a constructed channel object. Therefore, a channel may not be discerned or deemed as being effectively closed if the open pending count is not zero (regardless of whether the send pending count is zero).

Similarly, if the send pending count is greater than a threshold, then this can mean that usage of the web application 108 in the context of the current monitoring session 118 has not yet finished, because the web browser software 110 may still be waiting for incoming messages from the application 108 in response to its outgoing messages. As has been noted, though, because the persistent full-duplex communication channel protocol may not be a request-response protocol like HTTP, not every outgoing message may result in an incoming message being responsively received, and similarly incoming messages can be received that are not responsive to any outgoing message. Nevertheless, a send pending count that is relatively large is still a useful indicator that the web browser software 110 is still using the web application in the current monitoring session 118. Therefore, in one specific implementation, a channel may not be discerned as being effectively closed until the send pending count is less than the threshold (and the open pending count is zero). However, in other implementations, the send pending count may be greater than the threshold and still considered as effectively closed, such as if a timeout value has been exceeded.

In one implementation, once it is determined that the channel between the client 102 and the server 104 has been effectively closed (214), the replacement channel protocol code 116 may correspondingly notify the vulnerability detection software 112, which can thus parse the web application monitoring session messages 122 that have been intercept to detect the formatting of information contained within the messages 122 (216). However, as noted above, in another implementation, message parsing can occur concurrently with message interception.

In one implementation, once the message formatting has been determined, the vulnerability detection software 112 can spawn a web application probing browser session 120 to probe the web application 108 running on the server 104 for security vulnerabilities (218). As noted above, however, in another implementation, the web application 108 may be probed by the vulnerability detection software 112 directly, without having to use the web application 108. The vulnerability detection software 112 can use the determined formatting in generating, modifying, or injecting outgoing messages sent to the server 104 and in interpreting the incoming messages that are responsively received from the server, to asses—whether there are any security vulnerabilities.

Figure 3:
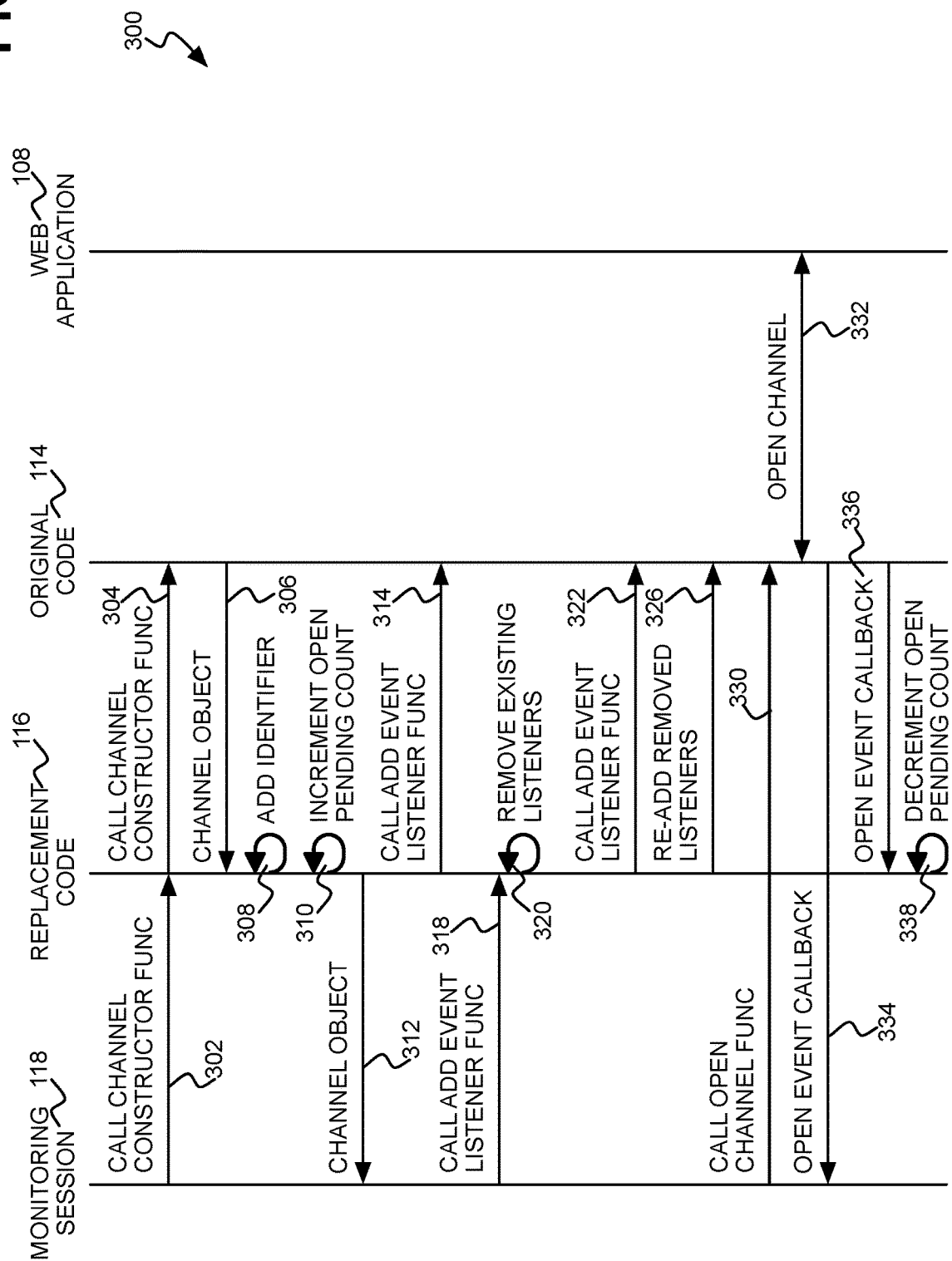
FIG. 3 shows a timeline of an example process when a channel object is created and then a channel associated with the channel object subsequently opened.

FIG. 3 shows a timeline of an example process 300 when a channel object is created and then a channel subsequently associated with the channel object is subsequently opened. The web application monitoring browser session 118 of the web browser software 110, the replacement channel protocol code 116, the original channel protocol code 114, and the web application 108 running on the server 104 are depicted in FIG. 3. Thus, FIG. 3 illustrates the creation of a channel object and the subsequent opening of an associated channel with respect to the interaction of the monitoring session 118, the replacement code 116, the original code 114, and the web application 108.

The monitoring session 118 initiates a call to a channel constructor function to create a channel object so that the monitoring session can subsequently open an associated channel (302). Because the replacement code 116 has replaced the original channel constructor function within the original code 114 with a replacement channel constructor function having the same name (as has been described in relation to part 204 of FIG. 2), the replacement code 116 receives this request. The replacement code 116 responsively calls the original channel constructor function within the original code 114 (304), to actually create the channel object. The replacement code 116 thus receives the created channel object from the original code (306).

The replacement code 116 can then add an identifier to the channel object (308), and increment the open pending count (310), before returning the channel object to the monitoring session 118 in response to the session 118's call of the replacement channel constructor function (312). The replacement code 314 can also add an event listener to an open event for the channel object and an event listener to an incoming message event of for the channel object, as has been described in relation to part 202 of FIG. 2, by calling the original add event listener function of the original code 114 (314). That is, the replacement code 314 can call the original add event listener function twice: once for adding an event listener to the open event, and once for adding an event listener to the incoming message event.

The monitoring session 118 may also add event listeners to the channel object, such as in the course of preparing for normal usage of the web application 108. The monitoring session 118 initiates a call to an add event listener function for each event listener that the session 118 is to add to the channel object (318). Because the replacement code 116 has replaced the original add event listener function within the original code 114 with a replacement add event listener function having the same name (as has been described in relation to part 206 of FIG. 2), the replacement code 116 receives this request.

If the monitoring session 118 is adding a new event listener to the incoming message event of the channel object, the replacement code 116 first temporarily removes every event listener that has already been added to the incoming message event (320). The replacement code 116 then calls the original add event listener function of the original code 114 to add the new event listener as requested by the monitoring session 118 (322), and then re-adds every temporarily removed event listener back to the incoming message event (326). For instance, the replacement code 116 may call the original add event listener function of the original code 114 for each temporarily removed event listener.

When the monitoring session 118 is ready to open a channel associated with the channel object, it initiates a call to the open channel function (330). Because the replacement code 116 has not replaced the open channel function in the example of FIG. 3, the original code 114 receives this request. The original code 114 responsively establishes (i.e., opens) the channel with the web application 108, between the client 102 and the server 104, so that the web browser software 110 at the client 102 can run the web application 108 on the server 104 within the context of the monitoring session 118.

Once the channel has been opened, the original code 114 fires or issues an open event, resulting in a callback to each event listener that has been added to the open event of the channel object for the opened channel. As such, there is a callback to each event listener that the monitoring session 118 may have added to the open event (334). There is also a callback to the event listener that the replacement code 116 added to the open event (336). Responsive to receiving the callback to its event listener added to the open event (as has been described in relation to part 202 of FIG. 2), the replacement code 116 can decrement the open pending code that was previously incremented in part 310 (338).

Figure 4:
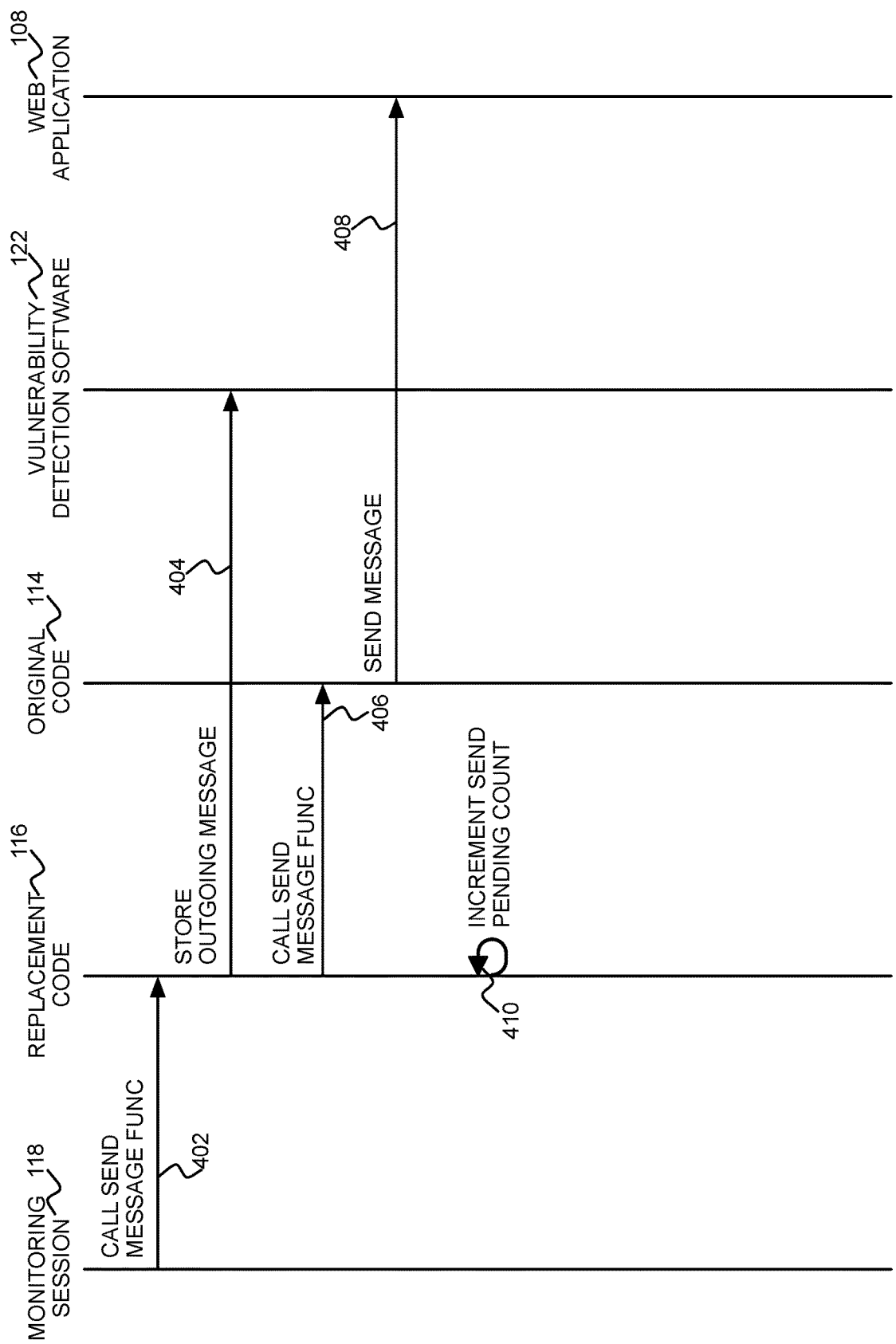
FIG. 4 shows a timeline of an example process when an outgoing message is sent on an opened channel.

FIG. 4 shows a timeline of an example process 400 when an outgoing message is sent on an opened channel. The process 400 occurs after the process 300 has already occurred, for instance. The web application monitoring browser session 118 of the web browser software 110, the replacement channel protocol code 116, the original channel protocol code 114, the vulnerability detection software 112, and the web application 108 running on the server 104 are depicted in FIG. 4. FIG. 4 thus illustrates the transmission of an outgoing message with respect to the interaction of the monitoring session 118, the replacement code 116, the original code 114, and the web application 108.

When the monitoring session 118 is to send an outgoing message on the channel between the client 102 and the server 104 to the web application 108, such as within the normal usage of the web application in the context of the session 118, it initiates a call to the send message function (402). Because the replacement code 116 has replaced the original send message function within the original code 114 with a replacement send message function having the same name (as has been described in relation to part 208 of FIG. 2), the replacement code 116 receives this request. The replacement code 116 stores the outgoing message, such as by sending the message along with the identifier that the code 116 previously added to the channel object associated with the channel to the vulnerability detection software 122, or by otherwise storing the message and the channel object's identifier within the messages 122 of FIG. 2 (404). The outgoing message is therefore effectively intercepted by the replacement code 116.

The replacement code 116 calls the original send message function of the original code 114 to actually send the outgoing message to the web application (406). The original code 114 therefore respectively sends the message to the web application 108 over the channel between the client 102 and the server 104 (408). The replacement code 116 also increments the send pending count (410).

Figure 5:
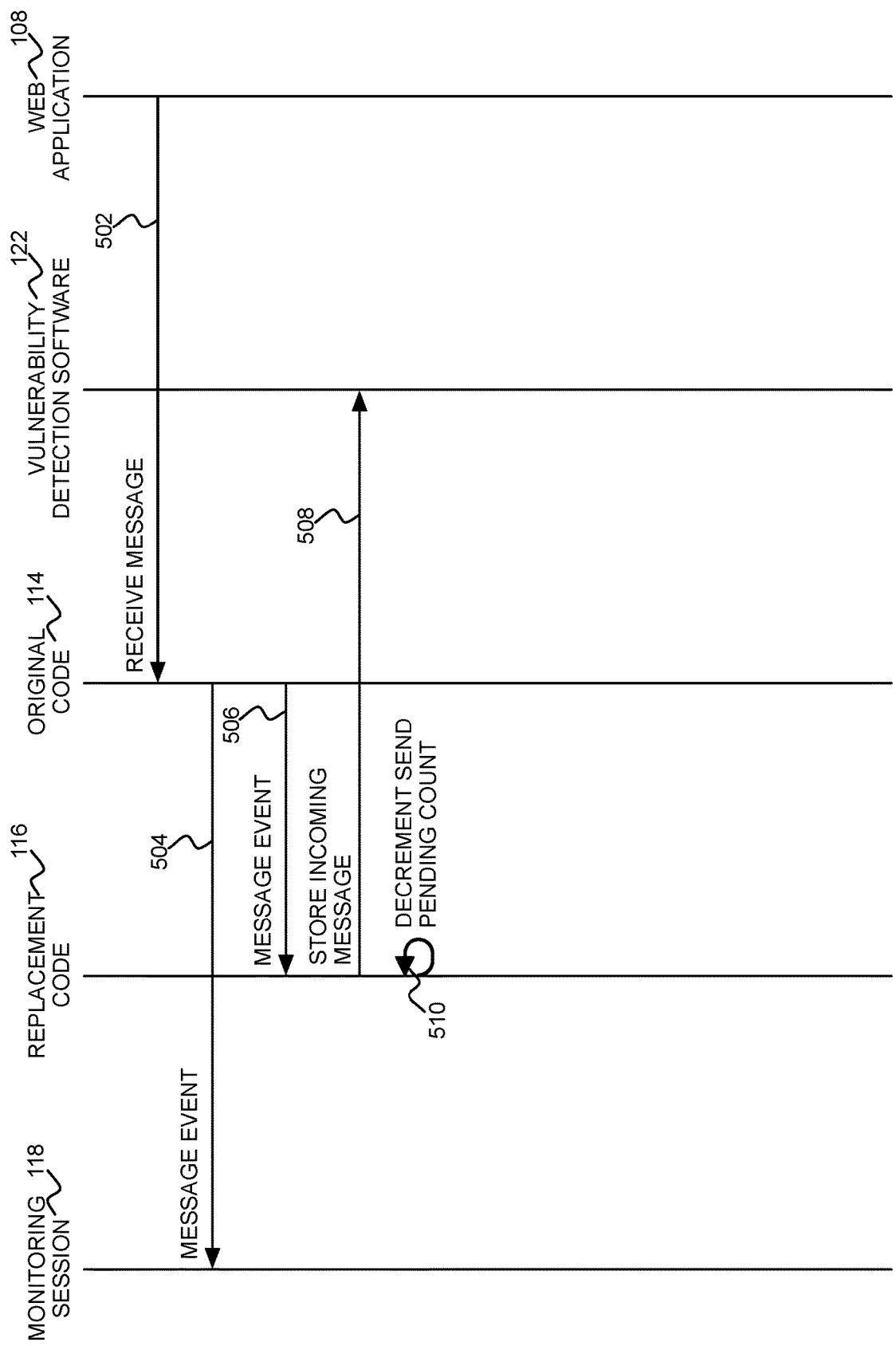
FIG. 5 shows a timeline of an example process when an incoming message is received on an opened channel.

FIG. 5 shows a timeline of an example process 500 when an incoming message is received over an opened channel. The process 500 occurs after the process 300 of FIG. 3 has already occurred, for instance. As in FIG. 4, the web application monitoring browser session 118 of the web browser software 110, the replacement channel protocol code 116, the original channel protocol code 114, the vulnerability detection software 112, and the web application 108 running on the server 104 are depicted in FIG. 5. FIG. 4 thus illustrates the receipt of an incoming message with respect to the interaction of the monitoring session 118, the replacement code 116, the original code 114, and the web application 108.

The original code 114 receives the incoming message from the web application 108 over the channel between the client 102 and the server 104 (502). The original code 114 responsively fires or issues a message event, resulting in a callback to each event listener that has been added to the message event of the channel object for the channel, to convey the incoming message to such event listeners. As such, there is a callback to each event listener that the monitoring session 118 may have added to the message event (504). Once all such even listeners have been called, the original code 114 then makes a callback to the event listener that the replacement code 116 added (506). This event listener is called last, as has been described in relation to part 206 of FIG. 2.

Responsive to receiving the callback to its event listener, the replacement code 116 stores the incoming message and the identifier that the code 116 previously added to the channel object associated with the channel (508). The replacement code 116 may, for instance, send the message along with the identifier to the vulnerability detection software 122, or by otherwise store the message and the identifier within the messages 122 of FIG. 2. The incoming message is therefore effectively intercepted by the replacement code 116. The replacement code 116 also decrements the send pending count (510).

Figure 6:
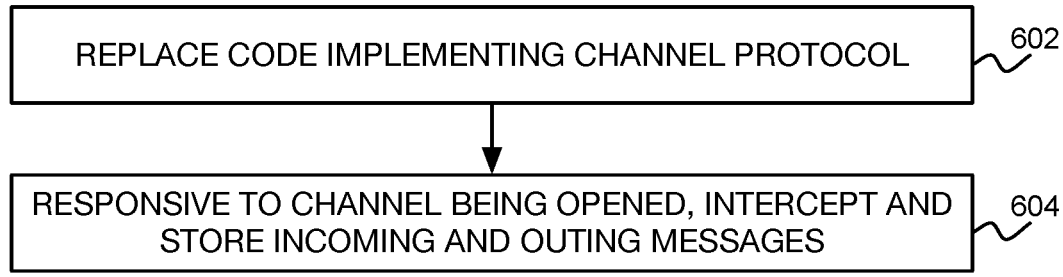
FIG. 6 shows a flowchart of an example method.

FIG. 6 shows an example method 600. The method 600 includes replacing original code implementing a full-duplex communication channel protocol within web browser software on a client computing device with replacement code (602). As has been described, the replacement code intercepts incoming and outgoing messages on a channel opened at the web browser software between the client computing device and a server computing device running a web application. The method 600 includes, responsive to the channel being opened at the web browser software, intercepting and storing the incoming and outgoing messages on the channel between the client computing device and the server computing device, via the replacement code (604).

Figure 7:
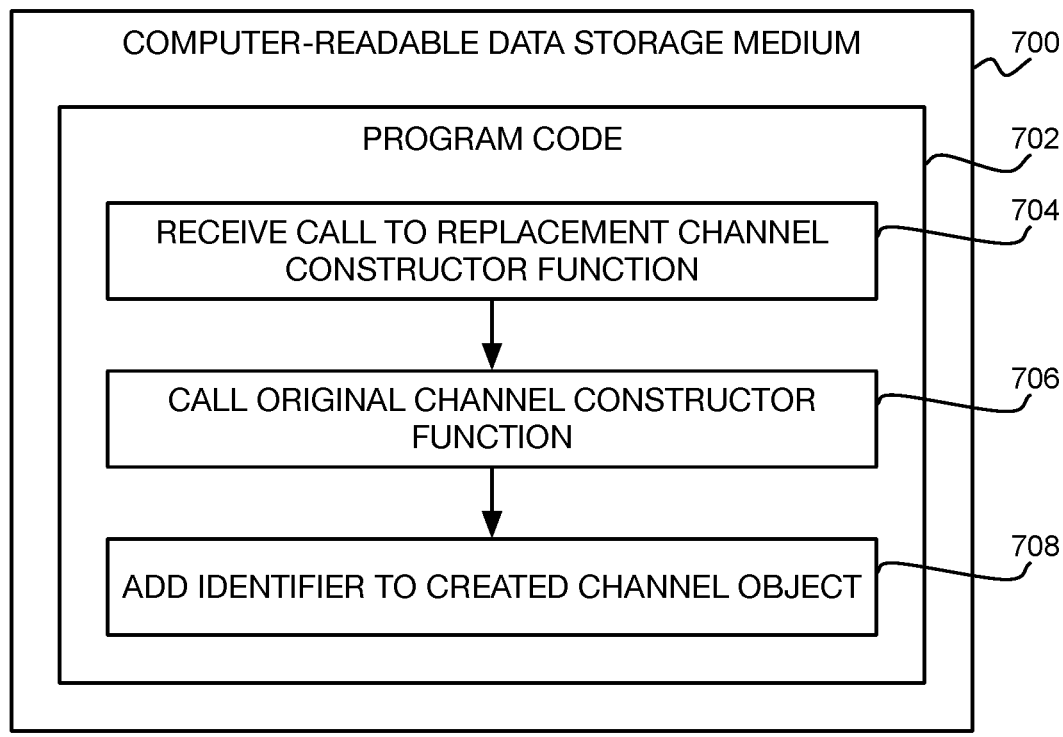
FIG. 7 shows a diagram of an example computer-readable data storage medium.

FIG. 7 shows an example computer-readable data storage medium 700. The computer-readable storage medium 700 stores program code 702 executable by a client computing device to perform processing. The processing includes receiving, by replacement code replacing original code implementing a full-duplex communication channel protocol within web browser software running on the client computing device, a call to a replacement channel constructor function of the replacement code (704). The replacement function has the same function name as an original channel constructor function of the original code.

The processing includes, responsive to receiving the call to the replacement channel construction function, calling, by the replacement channel constructor function, the original channel constructor function of the original code (706). The original function is called to actually create a channel object associated with a channel to be opened between the client computing device and a server computing device running a web application. The processing includes, upon the original channel construction function creating the channel object, adding, by the replacement channel constructor function, an identifier to the created channel object (708).

Figure 8:
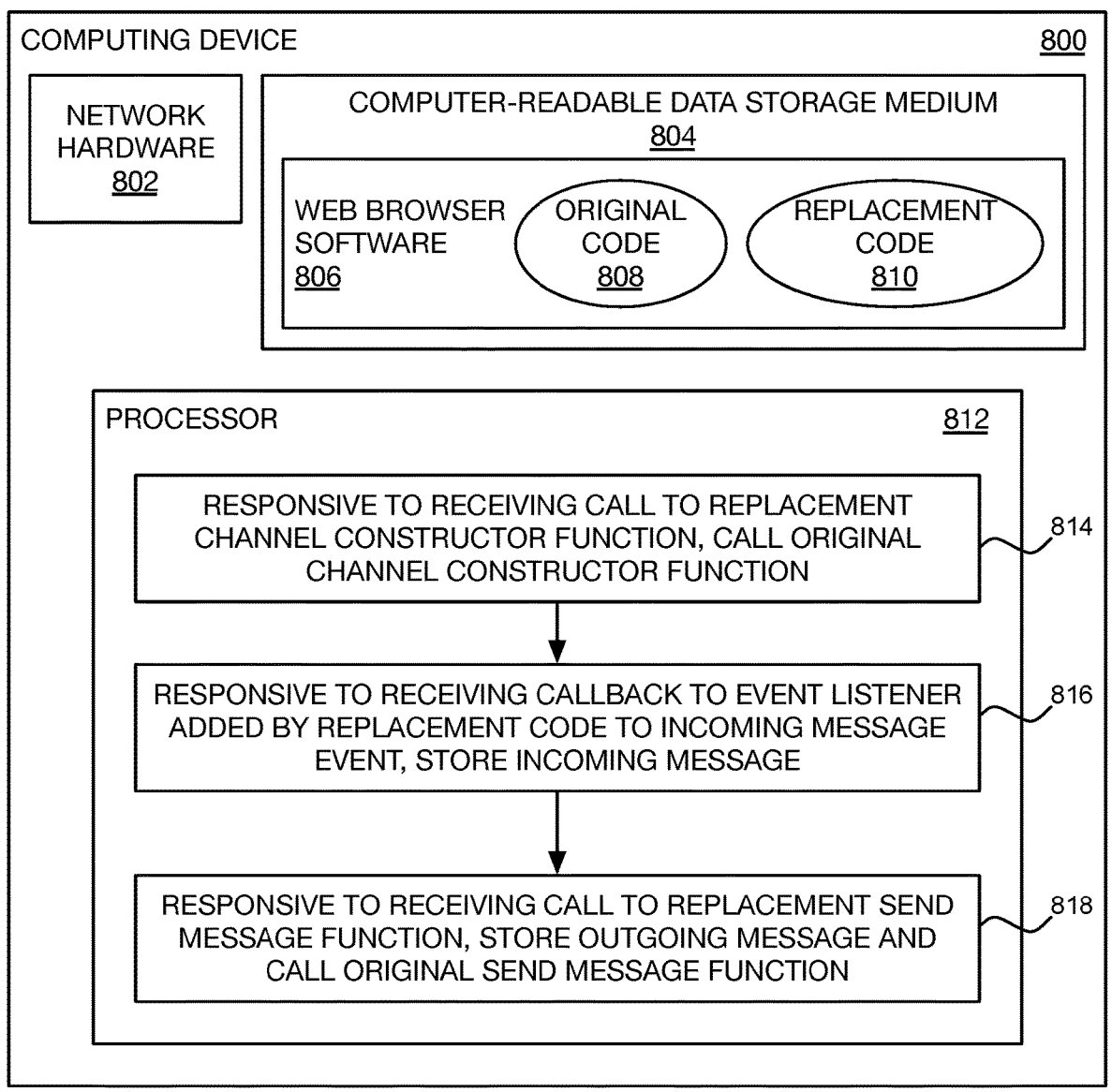
FIG. 8 shows a diagram of an example computing device.

FIG. 8 shows an example computing device 800. The computing device 800 can include other hardware components, in addition to those depicted in FIG. 8. The computing device 800 includes network hardware 802 to communicatively connect the computing device 800 to a server computing device running a web application. The computing device 800 includes a non-transitory computer-readable data storage medium 804. The computer-readable data storage medium 804 stores web browser software 806 having original code 808 implementing a full-duplex communication channel protocol and replacement code 810 to replace the original code 808.

The computing device 800 includes a processor 812 to execute the replacement code. The processor 812 thus is to, responsive to receiving a call to a replacement channel construction function, call an original channel constructor function of the original code 808 to create a channel object associated with a channel to be opened between the client computing device 800 and the server computing device and add an identifier to the created channel object (814). The processor 812 is to, responsive to receiving a callback to an event listener added by the replacement code 810 to an incoming message event for the channel object, store an incoming message associated with the callback along with the identifier of the channel object after any other event listener added to the incoming message event has been called (816). The processor 812 is to, responsive to receiving a call to a replacement send message function of the replacement code 810, store an outgoing message specified by the received call along with the identifier of the channel object, and call an original send message function of the original code to send the outgoing message over the channel to the server computing device (818).

Techniques have been described herein to provide for interception of both incoming and outgoing messages on a full-duplex communication channel, like a WebSocket socket or channel, between a client running web browser software and a server running a web application. The techniques provide for such message interception by original code implementing a full-duplex communication channel protocol, such as the code within a web browser software's JavaScript® engine that instruments a WebSocket class, with replacement code. Once messages have been intercepted, they can then be parsed so that the web application running on the server can be probed for potential security vulnerabilities.

We claim:

1. A method comprising:
replacing code implementing a full-duplex communication channel protocol within web browser software on a client computing device with replacement code that intercepts incoming and outgoing messages on a channel opened at the web browser software between the client computing device and a server computing device running a web application; and
responsive to the channel being opened at the web browser software, intercepting and storing the incoming and outgoing messages on the channel between the client computing device and the server computing device, via the replacement code.

2. The method of claim 1, further comprising:
parsing the stored messages to determine formatting of information within the stored messages; and
probing the web application using another opened channel to the server computing device, based on the determined formatting of information within the stored messages, to identify security vulnerabilities within the web application.

3. The method of claim 2, further comprising:
determining whether the channel has been effectively closed at the web browser software by monitoring whether the channel has been constructed but not yet opened and monitoring whether incoming messages have been received from web application running on the server computing device in response to outgoing messages sent by the web browser software at the client computing device to the web application.

4. The method of claim 1, wherein replacing the code implementing the full-duplex communication channel protocol within the web browser software on the client computing device with the replacement code comprises:
replacing an original channel constructor function with a replacement channel constructor function having a same function name,
wherein the replacement channel constructor function is called instead of the original channel constructor function at the web browser software to create a channel object to be associated with the subsequently opened channel between the client computing device and the server computing device running the web application, and wherein upon being called, the replacement channel constructor function calls the original channel constructor function to create the channel object and adds an identifier to the created channel object.

5. The method of claim 4, wherein upon being called, the replacement channel constructor function further increments an open pending count, and adds an event listener to an open event for the channel object, and wherein responsive to the channel with which the channel object is associated being opened, the event listener added to the open event decrements the open pending count.

6. The method of claim 4, wherein upon being called, the replacement channel constructor function adds an event listener to an incoming message event for the channel object, and wherein subsequent to the channel with which the channel object is associated having been opened, and responsive to an incoming message having been received from the server computing device over the channel, the event listener added to the incoming message event stores the incoming message with the identifier of the channel object after any other event listener added to the incoming message event has been called.

7. The method of claim 6, wherein responsive to the incoming message having been received from the server computing device over the channel, the event listener added to the incoming message event further decrements a send pending count.

8. The method of claim 6, wherein replacing the code implementing the full-duplex communication channel protocol within the web browser software on the client computing device with the replacement code further comprises:

replacing an original add event listener function with a replacement add event listener function having a same function name, wherein the replacement add event listener function is called instead of the original add event listener function at the web browser to add an application-specific event listener to the incoming message event for the channel object, and wherein upon being called, the replacement add event listener function temporarily removes the event listener that has been added to the incoming message event, along with any other event listener added to the incoming message event, and then adds the application-specific event listener to the incoming message event before re-adding every temporarily removed event listener.

9. The method of claim 4, wherein replacing the code implementing the full-duplex communication channel protocol within the web browser software on the client computing device with the replacement code further comprises:

replacing an original send message function with a replacement send message function having a same function name, wherein the replacement send message function is called instead of the original send message function at the web browser to send an outgoing message over the channel to the server computing device running the web application, and wherein upon being called, the replacement send message function stores the outgoing message with the identifier of the channel object and before calling the original send message function, sends the outgoing message over the channel to the server computing device.

10. The method of claim 9, wherein upon being called, the replacement send message function further increments a send pending count before calling the original send message function to send the message over the channel to the server computing device.

11. The method of claim 1, wherein the full-duplex communication channel protocol is a version of the WebSocket full-communication channel protocol.

12. A non-transitory computer-readable data storage medium storing program code executable by a client computing device to perform processing comprising:

receiving, by replacement code replacing original code implementing a full-duplex communication channel protocol within web browser software running on the client computing device, a call to a replacement channel constructor function of the replacement code having a same function name as an original channel constructor function of the original code;

responsive to receiving the call to the replacement channel construction function, calling, by the replacement channel constructor function, the original channel constructor function of the original code to create a channel object associated with a channel to be opened between the client computing device and a server computing device running a web application; and upon the original channel construction function creating the channel object, adding, by the replacement channel constructor function, an identifier of the channel object.

13. The non-transitory computer-readable data storage medium of claim 12, wherein the processing further comprises, upon the original channel construction function creating the channel object:

incrementing, by the replacement channel constructor function, an open pending count;

adding, by the replacement channel constructor function, an event listener to an open event for the channel object;

receiving, by the replacement code, a callback to the event listener upon the channel being opened; and responsive to receiving the callback to the event listener, decrementing, by the replacement code, the open pending count.

14. The non-transitory computer-readable data storage medium of claim 12, wherein the processing further comprises, upon the original channel construction function creating the channel object:

adding, by the replacement channel constructor function, an event listener to an incoming message event for the channel object;

subsequent to the channel having been opened, receiving, by the replacement code, a callback to the event listener upon an incoming message having been received from the server computing device over the channel; and responsive to receiving the callback to the event listener, storing, by the replacement code, the incoming message along with the identifier of the channel object after any other event listener added to the incoming message event has been called.

15. The non-transitory computer-readable data storage medium of claim 14, wherein the processing further comprises, upon the original channel construction function creating the channel object:

responsive to receiving the callback to the event listener, decrementing, by the replacement code, a send pending count.

16. The non-transitory computer-readable data storage medium of claim 12, wherein the processing further comprises, upon the original channel construction function creating the channel object:

receiving, by the replacement code, a call to a replacement add event listener function of the replacement code having a same function name as an original add event listener function of the original code;

responsive to receiving the call to the replacement add event listener function, temporarily removing, by the replacement add event listener function, any event listener already added to an incoming message event for the channel object;

after removing any event listener already added to the incoming message event, adding, by the replacement add event listener function, an application-specific event listener specified by the received call to the incoming message event; and after adding the application-specific event listener, re-adding, by the replacement add event listener function, every temporarily removed event listener back to the incoming message event.

17. The non-transitory computer-readable data storage medium of claim 12, wherein the processing further comprises, upon the original channel construction function creating the channel object:

subsequent to the channel having been opened, receiving, by the replacement code, a call to a replacement send message function of the replacement code having a same function name as an original send message function of the original code;

responsive to receiving the call to the replacement send message function, storing, by the replacement send message function, an outgoing message specified by the received call to the replacement send message function along with the identifier of the channel object; and after storing the outgoing message along with the identifier of the channel object, calling, by the replacement send message function, the original send message function to send the outgoing message over the channel to the server computing device.

18. The non-transitory computer-readable data storage medium of claim 17, wherein the processing further comprises, upon the original channel construction function creating the channel object:

responsive to receiving the call to the replacement send message function, incrementing, by the replacement send message function, a send pending count.

19. The non-transitory computer-readable data storage medium of claim 12, wherein the full-duplex communication channel protocol is a version of the WebSocket full-communication channel protocol.

20. A computing device comprising:

network hardware to communicatively connect the computing device to a server computing device running a web application;

a non-transitory computer-readable data storage medium storing:

web browser software having original code implementing a full-duplex communication channel protocol;

replacement code to replace the original code of the web browser software implementing the full-duplex communication channel protocol; and a processor to execute the replacement code to:

responsive to receiving a call to a replacement channel construction function, call an original channel constructor function of the original code to create a channel object associated with a channel to be opened between the client computing device and the server computing device, and add an identifier of the channel object;

responsive to receiving a callback to an event listener added by the replacement code to an incoming message event for the channel object, store an incoming message associated with the callback along with the identifier of the channel object after any other event listener added to the incoming message event has been called; and responsive to receiving a call to a replacement send message function of the replacement code, store an outgoing message specified by the received call along with the identifier of the channel object, and call an original send message function of the original code to send the outgoing message over the channel to the server computing device.

* * * * *